(12) United States Patent
Dreher et al.

(10) Patent No.: US 10,107,308 B2
(45) Date of Patent: Oct. 23, 2018

(54) PISTON-CYLINDER UNIT AND METHOD FOR OPERATING SAME

(71) Applicant: Schaeffler Technologies AG & Co. KG, Herzogenaurach (DE)

(72) Inventors: Alexander Dreher, Sinzheim (DE); Marco Treder, Buhl (DE)

(73) Assignee: SCHAEFFLER TECHNLOGIES AG & CO. KG, Herzogenaurach (DE)

( * ) Notice: Subject to any disclaimer, the term of this patent is extended or adjusted under 35 U.S.C. 154(b) by 303 days.

(21) Appl. No.: 14/911,631

(22) PCT Filed: Oct. 16, 2014

(86) PCT No.: PCT/DE2014/200559
§ 371 (c)(1),
(2) Date: Feb. 11, 2016

(87) PCT Pub. No.: WO2015/070849
PCT Pub. Date: May 21, 2015

(65) Prior Publication Data
US 2016/0195112 A1 Jul. 7, 2016

(30) Foreign Application Priority Data

Nov. 14, 2013 (DE) .................. 10 2013 223 232

(51) Int. Cl.
*F15B 21/00* (2006.01)
*F15B 11/10* (2006.01)
(Continued)

(52) U.S. Cl.
CPC ............. *F15B 11/10* (2013.01); *F16D 25/12* (2013.01); *F16D 48/066* (2013.01); *F15B 2211/6653* (2013.01); *F15B 2211/75* (2013.01); *F16D 2048/0212* (2013.01); *F16D 2500/1026* (2013.01); *F16D 2500/10412* (2013.01); *F16D 2500/3024* (2013.01); (Continued)

(58) Field of Classification Search
CPC ................... F16D 25/12; F16D 48/066; F15B 2211/6313; F15B 11/10
USPC .......................................................... 60/452
See application file for complete search history.

(56) References Cited

U.S. PATENT DOCUMENTS

| | | |
|---|---|---|
| 5,794,512 A | 8/1998 | Prosch et al. |
| 2009/0218190 A1* | 9/2009 | Reuschel ............. F16D 25/088 192/85.63 |
| 2015/0096864 A1 | 4/2015 | Treder et al. |

FOREIGN PATENT DOCUMENTS

| | | |
|---|---|---|
| CN | 101512179 | 8/2009 |
| CN | 102264568 | 11/2011 |

(Continued)

*Primary Examiner* — Thomas E Lazo
*Assistant Examiner* — Daniel Collins
(74) *Attorney, Agent, or Firm* — Volpe and Koenig, P.C.

(57) ABSTRACT

A piston-cylinder unit (40) for hydraulic actuation of a clutch in a vehicle, including a piston (42), a cylinder (41) and a sealing element (43). The piston cylinder unit is fluidically linked to a fluid circuit (44), the piston (42) is axially displaceable in the cylinder, and the sealing element is arranged sealingly between the piston and the cylinder, characterized in that a sensor is arranged in or on the piston-cylinder unit, by which sensor a pressure can be measured in the interior of the piston-cylinder unit and/or in the fluidically linked fluid circuit. A method for operating the piston-cylinder unit is also provided.

5 Claims, 3 Drawing Sheets

(51) Int. Cl.
*F16D 48/06* (2006.01)
*F16D 25/12* (2006.01)
*F16D 48/02* (2006.01)

(52) U.S. Cl.
CPC .............. *F16D 2500/30409* (2013.01); *F16D 2500/7041* (2013.01); *F16D 2500/7061* (2013.01); *F16D 2500/70418* (2013.01)

(56) References Cited

FOREIGN PATENT DOCUMENTS

| | | |
|---|---|---|
| DE | 19523215 | 1/1997 |
| DE | 102012202162 | 8/2012 |
| DE | 102012220177 | 7/2013 |
| DE | 102013205237 | 10/2013 |

\* cited by examiner

PISTON-CYLINDER UNIT AND METHOD FOR OPERATING SAME

BACKGROUND

The invention relates to a piston-cylinder unit, in particular, for the hydraulic actuation of a clutch in a vehicle, with a piston, a cylinder, and a sealing material, wherein the piston-cylinder unit is fluidically linked to a fluid circuit, wherein the piston is displaceable axially in the cylinder, and wherein the sealing material is arranged sealingly between the piston and the cylinder. The invention also relates to a method for operating the piston-cylinder unit.

For the actuation of clutches, hydraulic actuators can be used that allow a targeted closing and opening of the clutch. Such hydraulic actuators are regularly formed by piston-cylinder units. These piston-cylinder units have a cylinder and a piston that is displaceable inside the cylinder. For sealing, at least one sealing element is arranged between the piston and the cylinder. By shifting the piston relative to the cylinder, a work fluid can be pumped or a pressure can be built up, wherein an adjustment of an adjustment element, for example, a hydraulically actuated clutch or a brake, can be realized. Such a piston-cylinder unit has become known, for example, from DE 195 23 215 A1.

Temperature changes or other influences can cause a change of the volume of the work fluid. This change in volume can have a negative effect on the operation of the piston-cylinder unit. Therefore, the change in volume must be equalized. Such a volume equalization is enabled, for example, by a so-called snifting process. During the snifting process, the change in volume of the work fluid is equalized by a feeding of work fluid from a storage volume or by the discharging of work fluid into a storage volume. The feeding or discharging of the work fluid can be achieved here, for example, by a hole or a groove arranged in the piston and/or in the cylinder. The snifting process is triggered in that the piston-cylinder unit is moved into a predetermined position, which enables the regulated fluid exchange.

In the prior art, solutions are known in which two piston-cylinder units are connected to each other such that the actuation of one piston-cylinder unit actuates the corresponding second piston-cylinder unit. In this way, one of the piston-cylinder units has the slave cylinder and the other piston-cylinder unit has the master cylinder, wherein the actuation of the piston in the slave cylinder is caused by means of the piston of the master cylinder.

In order to enable the most dynamic control possible, the goal of such piston-cylinder units is to actuate as quickly as possible in order to quickly open or close a clutch actuated by at least one piston-cylinder unit. Temperature effects can cause, among other things, an increase in friction that has the result that the adjustment of a piston-cylinder unit takes place more slowly. The different adjustment rates can lead to the formation of an underpressure in one of the piston-cylinder units. This underpressure can cause leaks due to the seals being lifted from their sealing surfaces. This can lead to the undesired suction of air or work fluid into the piston of the affected piston-cylinder unit. In both cases, in particular, the characteristic curve is negatively affected with respect to the operating path of the piston-cylinder unit. An underpressure can also be produced in an individual piston-cylinder unit.

If the affected piston-cylinder unit is used for controlling a clutch, the coupling characteristic curve of the clutch is also influenced with respect to the operating path of the piston-cylinder unit, which can cause losses in comfort, because the expected torque to be transmitted to the clutch based on the torque control no longer agrees with the actually transmitted torque.

SUMMARY

The objective of the invention is to provide a piston-cylinder unit that allows the dynamic adjustment of the piston, wherein the creation of an underpressure within the piston-cylinder unit is reduced or completely ruled out. It is also an objective of the invention to provide a method for operating the piston-cylinder unit.

The objective of the invention with respect to the piston-cylinder unit having one or more features of the invention.

An embodiment of the invention relates to a piston-cylinder unit, in particular, for the hydraulic actuation of a clutch in a vehicle, with a piston, a cylinder, and a sealing material, wherein the piston-cylinder unit is fluidically linked to a fluid circuit, wherein the piston is axially displaceable in the cylinder and wherein the sealing material is arranged sealingly between the piston and the cylinder, wherein a sensor is arranged in or on the piston-cylinder unit and a pressure in the interior of the piston-cylinder unit and/or in the fluidically linked fluid circuit can be measured by the sensor.

In particular, movement of the piston that is too fast in a piston-cylinder unit can cause an underpressure in the piston-cylinder unit. This can have the result that work fluid or air is suctioned through the sealing material arranged between the piston and the cylinder. This generates an unplanned and unforeseeable volume equalization in the interior of the piston-cylinder unit that leads to a change in the adjustment characteristics of the piston-cylinder unit. This change thus also acts on a clutch that can be adjusted by the affected piston-cylinder unit. Consequently, the characteristic curve of the clutch is also changed in an unexpected way.

The cause for this change is the volume equalization that is produced due to the underpressure produced in the piston-cylinder unit. By providing a sensor through which the pressure in the interior of the piston-cylinder unit can be detected, it can be recognized when an underpressure exists. Therefore, advantageously through an engagement in the mechanical and/or hydraulic system, an effect can be realized that counteracts a change of the adjustment characteristics and/or the characteristic curve of the clutch.

In one advantageous construction, the sensor can also be arranged such that it can detect the pressure within the fluid circuit in which the piston-cylinder unit is included. The fluid circuit can advantageously be a hydraulic circuit in which a work fluid flows, which causes the adjustment of the piston of the piston-cylinder unit. By detecting the pressure of the work fluid that is used in the piston-cylinder unit, information can also be gained on the creation of an underpressure in the piston-cylinder unit itself.

It is also advantageous if the piston can be displaced by a positioning element, wherein the adjustment speed of the piston can be specified by the positioning element as a function of the value output by the sensor.

The sensor advantageously detects the pressure in the interior of the piston-cylinder unit or the pressure of the work fluid with which the piston-cylinder unit is loaded. The sensor can forward the detected measured value to a positioning unit and/or an evaluation unit, for example, a control unit. An adjustment setting that is forwarded to the positioning unit is generated in the positioning unit itself or in the evaluation unit on the basis of the sensor signal. Depending on the adjustment setting forwarded to the positioning unit, the positioning unit adjusts the piston. For example, the adjustment speed for the piston can be increased or lowered. In particular, by lowering the adjustment speed, the production of an underpressure can be reduced or an existing underpressure can be eliminated. Advantageously, the influence of the adjustment speed of the piston ends only after reaching an at least slight overpressure.

The value measured by the sensor can be used here as a signal directly for controlling the positioning unit or can be first signal-converted. In particular, the measured value can be compared in a control unit with a characteristic map stored in this control unit, so that this permits a situation-appropriate influencing of the adjustment speed of the piston. In addition to the existing pressure relationships, other parameters can also be used for generating an adjustment setting. These parameters can be, for example, temperatures, the transmitted torque, or a difference between the transmitted torque and the expected torque.

In addition, it can be advantageous if an overpressure and/or an underpressure can be measured by the sensor, wherein the signal that can be output by the sensor is proportional to the measured pressure.

Advantageously, both an overpressure and also an underpressure can be detected by the sensor. This allows monitoring of the pressure in the piston-cylinder unit or in the connected hydraulic circuit in all relevant pressure ranges. For the case that a slight overpressure exists in the interior of the piston-cylinder unit, for example, the adjustment speed must not be directly influenced, because the overpressure prevents undesired suctioning of the work fluid or air past the sealing material.

Advantageously, the signal output by the sensor is proportional to the measured pressure. This means that the output signal changes directly with the measured pressure. In this way, a response can also be made to slight fluctuations in the pressure. The output signal can be output either by the sensor itself or by a control unit. A proportional relationship between the measured pressure and the output signal is advantageous because it allows a greater dynamic response to signal changes. The signal changes with the measured value itself.

A correction factor can be provided with which the signal is weighted. This can be constant or variable. A changing correction factor can be defined, for example, by a specified characteristic map.

It can also be preferable when the sensor outputs a constant signal that has an amplitude not dependent on the measured value when there is a change from an overpressure to an underpressure or from an underpressure to an overpressure.

A sensor that indicates only the transition from an overpressure to an underpressure or from an underpressure to an overpressure is especially advantageous, because the structure is significantly simpler and thus the costs are lower. The sensor here advantageously outputs a constant signal starting from the time of the sign change of the pressure. The sensor allows, in a simple way, the detection of the sign range of the existing pressure. By influencing the adjustment speed, the existing pressure can be influenced. The adjustment speed can be slowed down until a new sign change occurs and thus the signal output previously by the sensor is equal to zero. If the sensor outputs a zero signal when an underpressure exists, an overpressure state can be detected by a signal that is different from zero.

The resolution of the existing pressure is here not as fine as for a sensor that outputs a signal proportional to the measured value. Influencing the system is therefore possible only with a lower quality. Adapting the adjustment speed is also slowed down by the use of such a sensor. The dynamic response of the pressure adaptation is lowered by the use of such a sensor. Nevertheless, the sensor forms a simple and robust possibility for influencing the system, in order to minimize or completely prevent the creation of underpressures.

The objective is also achieved by a method with one or more features of the invention.

One embodiment relates to a method for adjusting the piston of a piston-cylinder unit for the actuation of a clutch, wherein the following steps are performed:
  Detection of the pressure in the interior of the piston-cylinder unit and/or in the fluidically linked fluid circuit by means of a sensor in the form of a measured value,
  Conversion of the measured value into an adjustment setting for the positioning element,
  Specification of an adjustment speed for the piston by the positioning element,
  Adjustment of the piston by the positioning element,
  Detection of the pressure in the interior of the piston-cylinder unit and/or in the fluidically linked fluid circuit.

The method is especially advantageous because starting from the pressure in the interior of the piston-cylinder unit, an influence of the adjustment speed of the piston can be reached, wherein the further increase of the underpressure or the maintenance of an underpressure can be directly counteracted.

Advantageously, the measured pressure is converted by the sensor or a control unit such that a positioning unit adapts the adjustment of the piston accordingly such that the underpressure is eliminated. The positioning unit can be formed, for example, by an actuator that influences the adjustment of the piston-cylinder unit. For example, the actuator can be a valve that releases or closes a hydraulic circuit. Alternatively, the actuator could also be formed by another piston-cylinder unit that adjusts the piston.

The pressure is advantageously measured directly in the piston-cylinder unit or in the hydraulic circuit in which the work fluid flows, wherein this work fluid also flows within the piston-cylinder unit. Depending on the construction, information on the pressure in the interior of the piston-cylinder unit can be determined directly from the measured value in the hydraulic circuit or the pressure can be calculated by means of a conversion.

The value measured by the sensor and converted for the positioning unit advantageously leads to further adjustment of the piston with the adjustment settings that result from the measured value of the sensor, wherein, in particular, an adjustment speed that is lowered in comparison to the non-influenced system, leads to the elimination of the underpressure.

Advantageously, during the entire method, the pressure in the interior of the piston-cylinder unit is detected. The adjustment speed can be influenced continuously or at defined intervals.

One preferred embodiment is characterized in that the method is repeated in a control loop as long as the pressure detected in the interior of the piston-cylinder unit and/or in a fluidically linked fluid circuit is outside of a defined limiting range.

The defined limiting range is here limited at the bottom, in particular, by a zero value for the pressure or by a slight overpressure. In this way, in particular, the creation or increase of an underpressure should be prevented and advantageously an existing underpressure can be eliminated. Advantageously, the method that influences the adjustment speed of the piston is performed until the underpressure is completely eliminated and a slight overpressure exists.

In one advantageous construction, the pressure is detected either continuously or at fixed intervals even when this is in the range of an overpressure. In this way, an especially quick reaction to the occurrence of an underpressure can be achieved, which improves the quality of the clutch actuation.

It is also preferred when the adjustment speed of the piston is lowered when the measured value detected by the sensor corresponds to an underpressure.

By reducing the adjustment speed of the piston, the increase of the underpressure or the further existence of the underpressure can be counteracted. Here it is especially advantageous that the adjustment speed remains low in comparison to the normally set adjustment speed until the underpressure can be eliminated. Through a slower piston movement, equalization processes can better take place, for example, the flow of work fluid, wherein the creation of an underpressure is prevented.

In one especially favorable construction of the invention, it is also provided that the adjustment setting for the positioning element is formed by the measured value weighted with a changing correction factor, wherein the correction factor is larger the larger the underpressure detected by the sensor is.

It is especially advantageous to weight the measured value with a correction factor in order to achieve a higher dynamic response for the compensation. Here it is especially advantageous when the adjustment speed is reduced more strongly for a large underpressure than for a small underpressure. Through the strong reduction, the underpressure can be eliminated more quickly, which leads overall to a faster compensation of the underpressure.

By means of a correction factor, according to the formation of the correction factor, an especially adapted adjustment setting can be generated for the positioning element. Here, for example, a greater weighting of the high underpressure measured values can be generated in order to reach a faster compensation. In advantageous constructions, a characteristic map adapted to the whole system can also be stored for weighting the measured values, in order to achieve an advantageous elimination of the underpressure.

It is also advantageous when the method is applied for opening the clutch, wherein the method is applied first when the engagement point of the clutch that corresponds to a transmitted torque of approximately 0 Nm is reached or fallen below.

The method for regulating the underpressure or for influencing the adjustment speed is advantageously applied only during the opening process of the clutch. This is based on the fact that the creation of an underpressure occurs preferably during the opening of the clutch. In addition, the method is preferably applied only when the engagement point of the clutch is reached or fallen below. The engagement point is generally defined as a point at which the friction plates of a clutch indeed still contact each other, but no longer transmit a significant torque. It is especially advantageous to use the method starting from this point because then, through the use of the method, the dynamic response does not have a negative effect during the separation of the force transmission or for the elimination of the torque on the clutch.

It is further preferred when the pressure monitoring is active in the closed state and/or in the open state of the clutch.

Through a continuous monitoring of the pressure in the piston-cylinder unit, overall a faster reaction can be provided to the existence of an underpressure. Therefore, the adjustment characteristics can be positively influenced. Here, the pressure monitoring is active especially also when a so-called snifting process is performed, which is used for equalizing work fluid based on fluctuations in volume.

BRIEF DESCRIPTION OF THE DRAWINGS

The present invention is explained in more detail below with reference to preferred embodiments in connection with the associated figures.

Shown are.

DETAILED DESCRIPTION OF THE PREFERRED EMBODIMENTS

Figure 1:
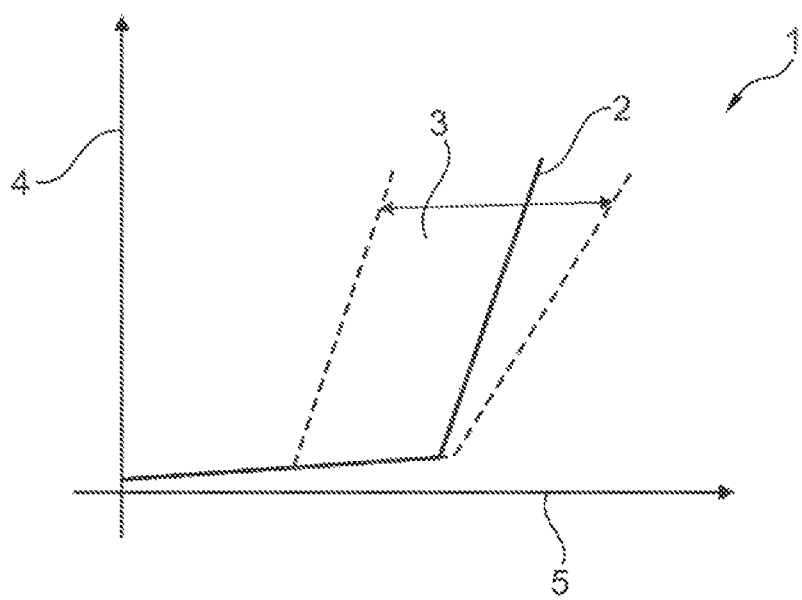
FIG. 1 a coupling characteristic curve of a clutch that can be actuated by a piston-cylinder unit, wherein a scatter area is shown that describes the area in which the characteristic curve can be displaced, FIG. 2 a two-part diagram, wherein, in the upper area, a pressure curve versus time is shown, how it can typically be detected by a sensor in a hydraulic circuit of a piston-cylinder unit, which is provided for actuating a clutch of a vehicle, wherein, in the lower area, the displacement of a piston of a piston-cylinder unit is shown versus time, FIG. 3 a flowchart that shows the successive processing steps of the method according to the invention in successive blocks, FIG. 4 a schematic view of a piston-cylinder unit that is connected fluidically to a fluid circuit, wherein, in the piston-cylinder unit and in the fluid circuit, a sensor is arranged for monitoring the pressure.

FIG. 1 shows a diagram 1 that shows the operating path of an actuator of a piston-cylinder unit on the X-axis designated with the reference symbol 5. On the Y-axis designated with the reference symbol 4, the pressure generated at the contact position between the drive side and driven side of a clutch is shown. The characteristic curve 2 of the clutch here follows the principle that a higher pressure is produced at the contact position between the clutch driving part and clutch driven part with increasing operating path of the actuator. The clutch is consequently closed with increasing operating path of the actuator. This is to be traced back to a greater pressure at the contact position due to the moving actuator of the piston-cylinder unit.

A conventional characteristic curve of a clutch is shown with the reference symbol 2, wherein the pressure at the contact point at first increases only slightly until a sufficiently large contact of the driving plates against the driven plates of the clutch is achieved. Starting at this time, the pressure at this contact point increases greatly, which is indicated by a significantly steeper slope of the characteristic curve 2.

The profile of the characteristic curve 2 is influenced by properties of the clutch, for example, the dimensioning of the springs, the properties of the friction plates, the geometric orientation of the elements relative to each other or the production tolerances. The characteristic curve 2 can be determined individually, however, for each clutch and is very similar or even identical within the scope of a certain tolerance for clutches of one construction type.

With the area 3, a scatter area is shown in which the characteristic curve 2 can be shifted based on interfering effects. These interfering effects can be produced, in particular, by the occurrence of an underpressure in the hydraulic circuit or in the piston-cylinder unit itself. The occurrence of an underpressure here leads, in particular, to unforeseeable fluctuations in the characteristic curve 2, which can result, for example, in a parallel displacement or tilting of the steeper part of the characteristic curve 2. In particular, the poor predictability for fluctuations is disadvantageous for comfort, because fluctuations can cause deviations from the expected torque to be transmitted and from the torque actually transmitted into the clutch. Such unforeseeable deviations in the characteristic curve 2 are therefore to be avoided for reasons of comfort.

Figure 2:
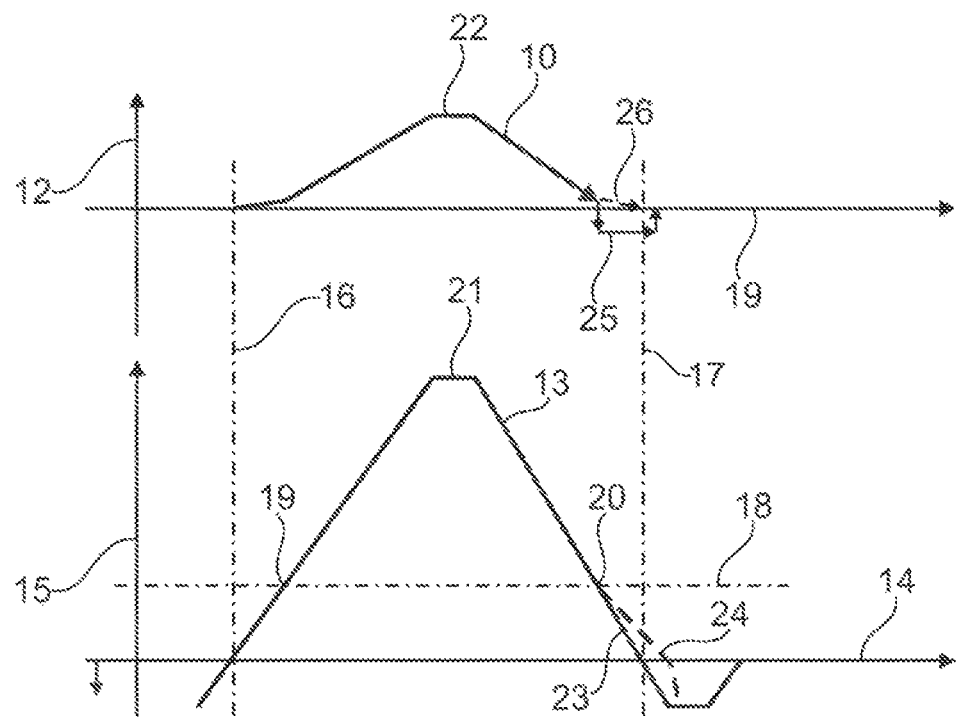

FIG. 2 shows, in the upper area, a characteristic curve 10 that shows, above the axis 19, an area in which an overpressure exists in the hydraulic system or in the piston-cylinder unit. The axis 19 corresponds to a time axis, wherein the time increases from left to right. Under the axis 19, the area of underpressure is shown. Thus, on the axis 12, an overpressure is plotted from the intersecting point of the axes 19, 12 upward and an underpressure is plotted from the intersecting point downward.

In the lower area of FIG. 2, the characteristic curve 13 is shown. The axis 14 that runs parallel to the upper axis 19 also shows a time curve that is identical to that of the axis 19. On the axis designated with the reference symbol 15, the position of the actuator of the piston-cylinder unit is shown.

Under the axis 14, the piston-cylinder unit that is used for actuating the clutch is in a so-called snifting process. In this process, the piston is moved relative to the cylinder such that a defined volume compensation can take place within the piston-cylinder unit. The clutch actuated by the piston-cylinder unit here transmits no torque.

The vertical lines 16, 17 designate a time 16 at which the piston-cylinder unit ends the snifting process by moving the piston relative to the cylinder. This can be achieved, for example, by closing an overflow opening. The time 17 describes the time at which the piston-cylinder unit begins a snifting process again.

With the horizontal line 18, the so-called engagement point of the clutch is shown. At the engagement point, the torque transmission by the clutch begins to build up when the line 18 at point 19 is passed through from below upward. The torque transmission ends at the engagement point, when the line 18 at the point 20 is passed through from above downward. At the engagement point, the actuator is moved such that the friction plates of the clutch contact each other, but there is still no significant torque transmission.

Starting from the left side of FIG. 2, the actuator is extended, whereby the clutch is closed. Starting from time 16 at which the clutch leaves the snifting area, a slight overpressure is created as can be recognized on the characteristic curve 10 in the upper area. In the intersecting point of characteristic curve 13 with the line 18 symbolizing the engagement point, the overpressure begins to increase greatly. The overpressure here results from a compression of the work fluid in the piston-cylinder unit or in the linked hydraulic circuit. The overpressure increases slowly until the clutch is moved into the area 21 of the characteristic curve 13. The area 21 here represents a stationary area in which the clutch is closed and the actuator is not moved. The overpressure consequently also remains constant in the area 22 of the characteristic curve 10.

Finally, the actuator is retracted again, whereby the profile of the characteristic curve 13 falls. The resulting overpressure that is shown by the characteristic curve 10 also falls. Both the pressure increase and also the pressure decrease are shown by linear profiles. They are caused by the similarly linear profile of the movement of the actuator.

Starting from when the line 18, which represents the engagement point, is fallen below, the clutch is in a state in which no torque can be transmitted anymore. In a system without the method according to the invention, that is, with a constant adjustment speed for the actuator, the operating path of the actuator runs as in the area of the characteristic curve 13 designated with the reference symbol 23. The movement is here continued at a constant speed until a snifting process finally begins again in the piston-cylinder unit.

This profile 23 includes the pressure profile 25 of the characteristic curve 10 from the above section. The pressure here falls almost abruptly in an area in which an underpressure exists. In this state it can happen that air or work fluid is suctioned uncontrollably through the non-underpressure-tight sealing element between the piston and the cylinder, whereby the characteristic curve of the piston-cylinder unit and thus also the characteristic curve of the actuated clutch is changed uncontrollably.

Therefore, in the method according to the invention, the adjustment speed of the actuator is reduced, which produces the profile 24 of the characteristic curve 13. The lower slope of the characteristic curve 13 shows that the adjustment speed is less than for the profile 23. When intersecting the axis 14, the adjustment speed is increased again, whereby the actuator, as originally also provided in the profile 23, falls to a level significantly below the axis 14. In the upper section, the pressure profile 26 corresponds to the method according to the invention for the actuator after the profile 24. In the pressure profile 26, no underpressure is generated at any point, whereby also the negative influence of the characteristic line 2 of the clutch is prevented.

The profiles 24 and 26 shown in FIG. 2 thus represent the pressure profile 26 and the operating path 24 of the actuator with respect to time, which are achieved when the method according to the invention is used. Both profiles at first deviate from the unchanging profiles 23 and 25 when the engagement point of the clutch is fallen below and thus there is no torque transmission into the clutch anymore. Therefore, the dynamic response of the clutch in the area of the normal closing process and the normal opening process is not negatively affected.

Figure 3:
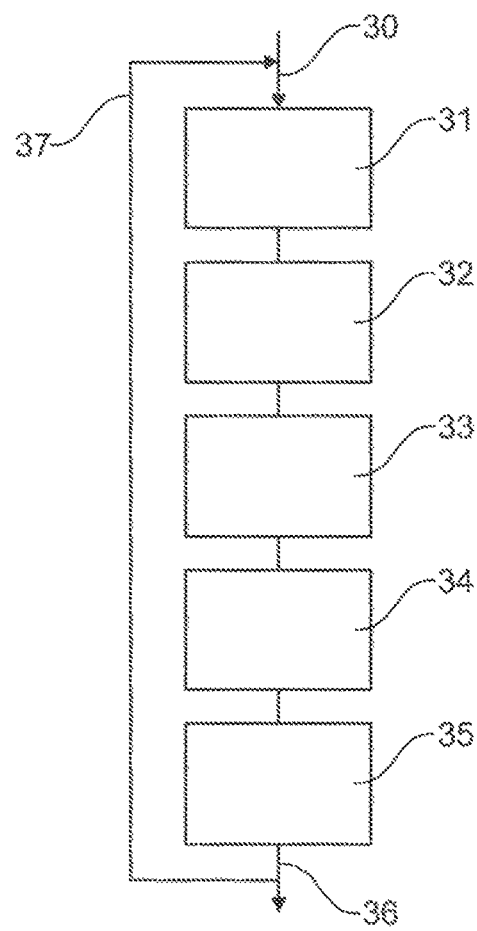

FIG. 3 shows a flowchart that describes an especially advantageous method for reducing or preventing an underpressure in the hydraulic circuit of the piston-cylinder unit or in the piston-cylinder unit itself.

Starting from the arrow 30 that represents the signal input to a sensor, the signal of the pressure sensor can be processed in the block with the reference symbol 31. It can be provided here, in particular, with a weighting factor or compared with a predefined characteristic map.

In block 32, the value detected by the sensor is converted into an adjustment setting for the positioning element that influences the position and the adjustment speed of the actuator. Then, in block 33, the adjustment speed of the actuator is adapted according to the settings made in block 32.

Finally, in block 34, the adjustment of the actuator or the piston of the piston-cylinder unit is performed. In block 35, the pressure in the hydraulic circuit or in the piston-cylinder unit is detected. The detection of the pressure can take place, deviating from the flowchart of FIG. 3, also continuously during the other processing steps.

Finally, the movement along the arrow 36 is either ended when the actuator arrives at the target position without creating an underpressure or the movement along the arrow 37 is repeated, whereby another movement of the actuator adapted with respect to the adjustment speed is possible. In advantageous constructions, an arbitrary number of passes of the movement in the flowchart of FIG. 3 can be realized. This depends first on the control quality, the control speed, and the target settings.

Figure 4:
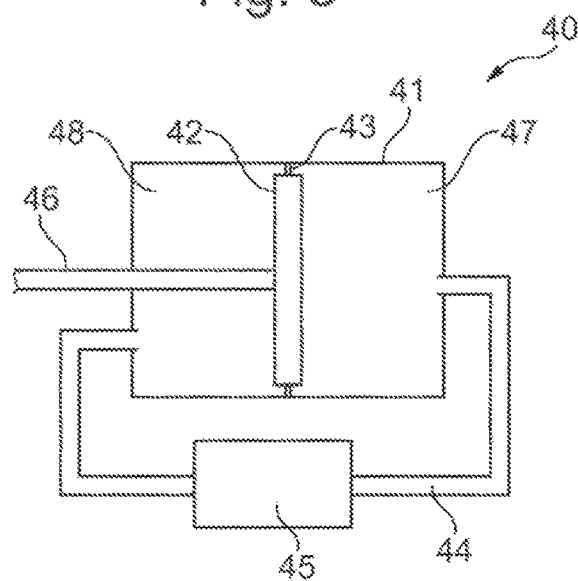

FIG. 4 shows a schematic view of a piston-cylinder unit 40 that is formed essentially by a cylinder 41, a piston 42, and sealing element 43. The piston 42 is here displaceable axially in the cylinder 41, while it is sealed relative to the cylinder 41 by the sealing element 43.

The work chamber 48 is arranged on the left of the piston 42 and the work chamber 47 is arranged on the right of the piston. The work chambers 47, 48 are linked fluidically to a fluid circuit 44. In FIG. 4, a positioning element 45 is arranged in the fluid circuit. The positioning element 45 can be, for example, another piston-cylinder unit that can cause a movement of the work fluid in the piston-cylinder unit 40, whereby an adjustment of the piston 42 can be generated relative to the cylinder 41. The positioning element 45 can also be formed in an advantageous construction by a valve that can influence the flow of the work fluid accordingly.

In an alternative construction, the piston 42 can also be linked mechanically to a piston of another piston-cylinder unit. The movement of the piston 42 is then caused by the movement of the not-shown piston. In this case, the coupling between the piston 42 and the not-shown piston, which acts as a positioning element, is mechanical and not hydraulic. In this case, the pressure can be measured either in the piston-cylinder unit 40 or in the not-shown piston-cylinder unit acting as a positioning element. The pressure in the piston-cylinder unit 40 can then be determined by means of a conversion, if the geometric properties of the two piston-cylinder units are known. For a mechanical linking of the piston 42, the piston-cylinder unit 40 is also fluidically linked to a fluid circuit 44. In particular, the work chambers 47, 48 are here linked to a fluid circuit 44.

Figure 5A:
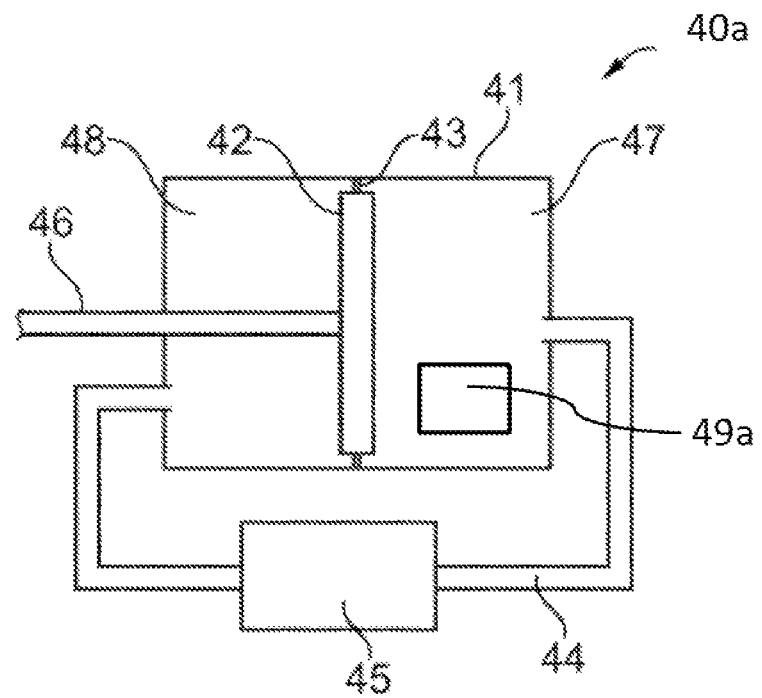
FIG. 5a illustrates a first embodiment of a sensor in a piston-cylinder unit.
Figure 5B:
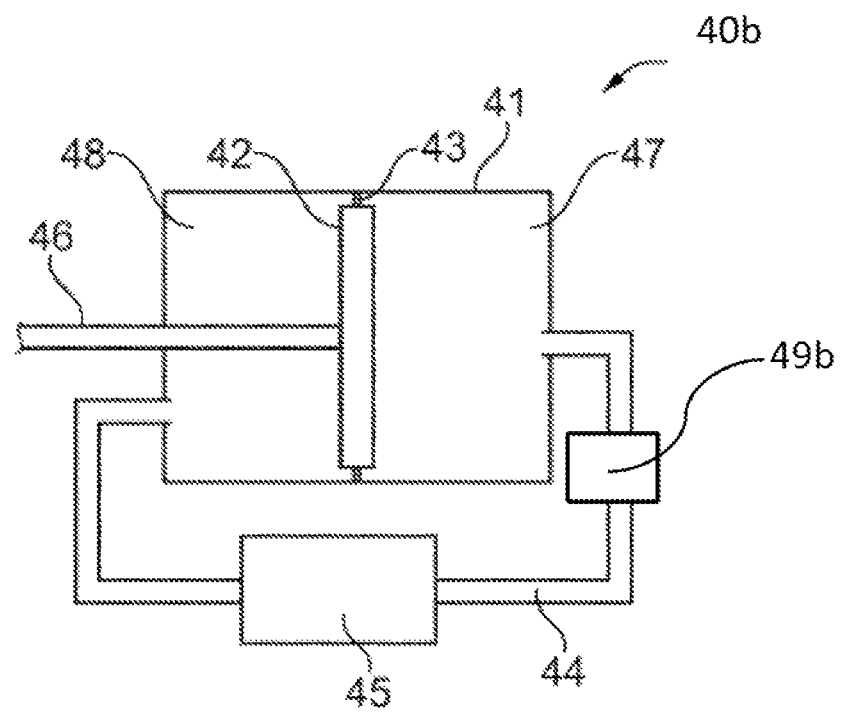
FIG. 5b illustrates a second embodiment of a sensor in a piston-cylinder unit.

As shown in FIG. 5a, in one embodiment of the piston-cylinder unit 40a, a pressure sensor 49a can be arranged, for example, in one of the work chambers 47, 48. Alternatively, as shown in FIG. 5b, a pressure sensor 49b can be linked from outside to the piston-cylinder unit 40b or can be integrated into the fluid circuit 44. Here it is essential that the pressure sensor can provide information on the pressure relationships in the piston-cylinder unit 40, for example, through a direct measurement or through a conversion. FIGS. 5a and 5b illustrate the same features of FIG. 4, which are not described in more detail herein with respect to FIGS. 5a and 5b except for the pressure sensors 49a, 49b.

A coupling can be linked, for example, to the piston rod 46 extending toward the left. Through a movement of the piston 42, the coupling is opened or closed.

The embodiments shown in FIGS. 1 to 4 do not have a restrictive effect, especially with respect to the especially advantageous method as well as the geometric construction. The figures are used, in particular, for illustrating the concept of the invention.

LIST OF REFERENCE NUMBERS

1 Diagram
2 Characteristic curve
3 Scatter area
4 Axis (pressure)
5 Axis (actuator position)
10 Characteristic curve (pressure profile in the hydraulic circuit or in the piston-cylinder unit)
11 Axis (time)
12 Axis (pressure)
13 Characteristic curve (actuator position)
14 Axis (time)
15 Axis (actuator position)
16 End of the blow process
17 Beginning of the blow process
18 Engagement area of the clutch
19 Intersecting point
20 Intersecting point
21 Area of the characteristic curve 13 (actuator idle position, clutch closed)
22 Area of the characteristic curve 10 (constant overpressure)
23 Profile of the characteristic curve 13 without method application
24 Profile of the characteristic curve 13 with method application
25 Profile of the characteristic curve 10 without method application
26 Profile of the characteristic curve 10 with method application
30 Signal input on the sensor (signal corresponds to measured pressure)
31 Processing of the measured value
32 Conversion of the measured value into a set default parameter
33 Adaptation of the adjustment speed
34 Adjustment of the actuator
35 Measurement of the pressure
36 End of the method
37 Repeating of the method
40 Piston-cylinder unit
41 Cylinder
42 Piston
43 Sealing element
44 Fluid circuit
45 Positioning means
46 Piston rod
47 Work space
48 Work space

The invention claimed is:

1. A piston-cylinder unit, comprising a piston, a cylinder, and a sealing element, wherein the piston-cylinder unit is fluidically linked to a fluid circuit, the piston is displaceable axially in the cylinder, and the sealing element is arranged sealingly between the piston and the cylinder, and a sensor arranged in or on the piston-cylinder unit that measures a pressure in at least one of an interior of the piston-cylinder unit, or the fluidically linked fluid circuit, wherein the piston is displaceable by a positioning element, and an adjustment speed of the piston is specified by the positioning element as a function of a value output by the sensor, and the sensor outputs a constant signal that has an amplitude that is independent of the value output by the sensor when there is a change from the overpressure to the underpressure or when there is a change from the underpressure to the overpressure.

2. A method for adjusting the piston of the piston-cylinder unit for the actuation of a clutch according to claim 1, further comprising the following steps:

detecting the pressure in at least one of the interior of the piston-cylinder unit, or the fluidically linked fluid circuit by using the sensor and signaling a measured value, converting the measured value into an adjustment setting for a positioning element, specifying an adjustment speed for the piston by the positioning element, and adjusting the piston by the positioning element.

3. The method for adjusting the piston of the piston-cylinder unit for the actuation of the clutch according to claim 2, further comprising repeating the steps in a control loop as long as the pressure detected in the at least one of the interior of the piston-cylinder unit or the fluidically linked fluid circuit is outside of a defined limiting range.

4. The method for adjusting the piston of the piston-cylinder unit for the actuation of the clutch according to claim 2, further comprising lowering the adjustment speed of the piston when the measured value detected by the sensor corresponds to an underpressure.

5. A method for adjusting the piston of the piston-cylinder unit for the actuation of a clutch, the piston-cylinder unit including a piston, a cylinder, and a sealing element, wherein the piston-cylinder unit is fluidically linked to a fluid circuit, the piston is displaceable axially in the cylinder, and the sealing element is arranged sealingly between the piston and the cylinder, and a sensor arranged in or on the piston-cylinder unit that measures a pressure in at least one of an interior of the piston-cylinder unit, or the fluidically linked fluid circuit, the method comprising:

detecting the pressure in the at least one of the interior of the piston-cylinder unit, or the fluidically linked fluid circuit by using the sensor and signaling a measured value, converting the measured value into an adjustment setting for a positioning element, specifying an adjustment speed for the piston by the positioning element, and adjusting the piston by the positioning element, wherein the adjustment setting for the positioning element is formed by the measured value weighted with a changing correction factor, and the correction factor is greater for a greater value of the underpressure measured by the sensor.

* * * * *